No. 870,628. PATENTED NOV. 12, 1907.
W. D. JANES.
BEARING FOR SHADE ROLLERS.
APPLICATION FILED OCT. 9, 1905.

WITNESSES: William D. Janes, INVENTOR
BY
Geo. P. Wilcox, ATTORNEY

UNITED STATES PATENT OFFICE.

WILLIAM D. JANES, OF SAGINAW, MICHIGAN.

BEARING FOR SHADE-ROLLERS.

No. 870,628.      Specification of Letters Patent.      Patented Nov. 12, 1907.

Application filed October 9, 1905. Serial No. 282,012.

*To all whom it may concern:*

Be it known that I, WILLIAM D. JANES, a citizen of the United States, residing at Saginaw, in the county of Saginaw and State of Michigan, have invented certain new and useful Improvements in Bearings for Shade-Rollers; and I do hereby declare the following to be a full, clear, and exact description of the invention, such as will enable others skilled in the art to which it appertains to make and use the same.

This invention is a bearing for shade rollers and relates more particularly to a bearing provided on the spear of a shade roller upon which bearing the shade roller pawl plate revolves when the shade is rolled and unrolled.

The objects of the invention are to provide a bearing of simple construction that will permit the roller to roll more smoothly and with less wear than has heretofore been possible in the usual construction where the metal of the pawl plate comes into contact with the metal of the spear.

As is well-known, shade roller spears are usually made of malleable iron, the surface of which is more or less rough, making but an inferior bearing upon which the pawl plate may rotate. It has been frequently attempted to increase the smoothness of operation of the roller by milling or turning the bearing surface of the spear, but in so doing it is found that the new surface of the spear, while true enough for a good bearing, is apt to be soft and porous, wears very rapidly and grinds. By means of my improvement I am enabled to use a rough or unmilled spear and to provide on it a smooth, true cylindrical bearing upon which the pawl plate may rotate.

The invention is illustrated in the accompanying drawings, in which

Figure 1:
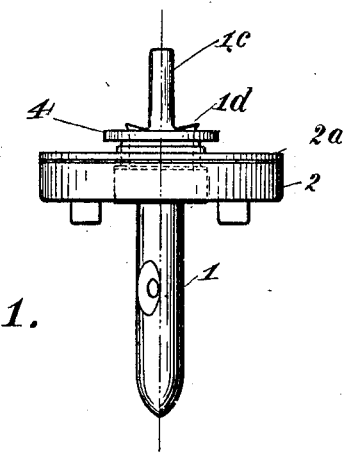
Figure 3:
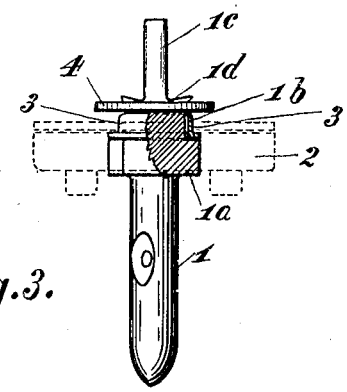
Figure 2:
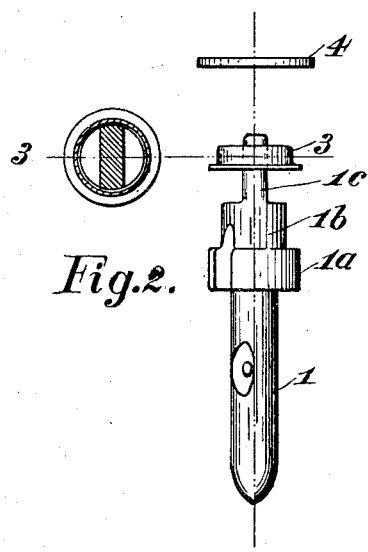
Figure 4:
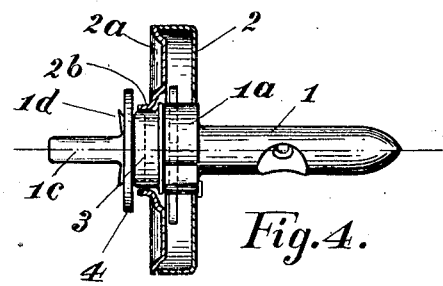

Figure 1 is a side view on an enlarged scale showing the pawl plate and a spear with my improved bearing attached. Fig. 2 is a view of the spear, showing the manner of assembling the bushing and washer thereon. Fig. 3 is a side view of the spear, bushing and washer assembled, the view being broken away in part. Fig. 4 is a side view of the assembled parts, showing the pawl plate in cross section.

(1) is the spear provided with the usual cylindrical part (1ᵇ) which has heretofore served as a bearing upon which the outer cover of the pawl plate (2ᵃ) revolves, as above noted. In my device, I provide the cover (2ᵃ) with a central opening, the edges (2ᵇ) of which are flanged outwardly to form a smooth bearing surface.

Between the cylindrical part (1ᵇ) of the spear and the flange (2ᵇ) of the cover, I interpose an eyelet or bushing (3), made of pressed sheet metal, preferably of brass, to form a smooth bearing, and it is upon the outer surface of this eyelet that the flange (2ᵇ) revolves when the window shade is raised or lowered.

To hold the eyelet (3) in place against the enlarged ratchet (1ᵃ) of the spear, I provide a washer (4) which is held in place by upsetting or otherwise outwardly flaring the end (1ᵈ) of the cylindrical part (1ᵇ). This may be done by means of a die or any suitable tool, capable of spreading the outer end of the part (1ᵇ), as shown in Figs. 1, 3 and 4. The washer (4) not only holds the eyelet in place, but also prevents rotation of the eyelet. It furthermore prevents the spear being driven in by an accidental blow on the end of the spear.

With the eyelet (3), it is possible to use a spear formed of malleable iron without particular regard to the accuracy of the part (1ᵇ), and without the necessity of turning it down or milling as heretofore, in order to form a cylindrical bearing for the pawl plate. The smooth surface afforded by the pressed metal eyelet (3) insures a true cylindrical easy-running bearing with a minimum of expense for material and labor. I may provide the eyelet with a flange 3ᵃ as shown to limit the inward movement of the pawl plate and also to take against the enlarged ratchet 1ᵃ. If the eyelet were flangeless a smart blow on the outer end of the spear might roughly upset the inner end of the eyelet and impair its usefulness.

It is of the utmost importance in the manufacture of high grade shade rollers that the bearing upon which the pawl plate revolves shall be so constructed that the roller will operate with sufficient play endwise and diametrically to permit the roller to revolve easily and smoothly, but not with sufficient play to permit it to grind, vibrate or operate noisily. If the bearing is too tight, either endwise or in the direction of its diameter, it will not operate freely.

By the use of the bearing shown, a perfectly smooth working surface is assured. Since the eyelets are easily made of almost absolutely uniform diameter, and all eyelets are of exactly the same size, the bearings can be made exactly alike, perfectly interchangeable, each having just the desired amount of play, both diametrically and lengthwise. By this means the labor cost of assembling and fitting up the rollers is greatly reduced.

What I claim as my invention and desire to secure by Letters Patent is as follows,—

1. The combination with a spear having an enlarged ratchet formed integrally therewith and located intermediate the ends of the spear, a bearing surface located in advance of the ratchet, and a pawl plate and pawl engaging the ratchet, of a smooth bushing received upon the bearing surface, the pawl plate resting upon the bushing and means for retaining the bushing in position.

2. The combination with a spear having an enlarged ratchet formed integrally therewith, a reduced circular bearing surface formed integrally with the ratchet and projecting therefrom, and a pawl plate rotatable relative to the spear, of a bushing encircling the bearing surface only, the bushing provided with a smooth periphery upon which the pawl plate rests.

3. The combination with a spear having an enlarged ratchet formed integrally therewith, a reduced circular bearing surface formed integrally with the ratchet and projecting therefrom, and a pawl plate rotatable relative to the spear, of a bushing encircling the bearing surface only, the bushing provided with a smooth periphery upon which the pawl plate rests, a flange carried by the bushing and a washer swaged on the outer end of the bearing surface for maintaining the bushing in position.

4. The combination with a spear having an enlarged ratchet formed integrally therewith, a reduced circular bearing surface formed integrally with the ratchet and projecting therefrom, and a pawl plate rotatable relative to the spear, of a bushing encircling the bearing surface only, the bushing provided with a smooth periphery upon which the pawl plate rests, and a washer swaged on the outer end of the bearing surface for maintaining the bushing in position.

In testimony whereof I affix my signature, in presence of two witnesses.

WILLIAM D. JANES.

Witnesses:
 MARK H. GREGG,
 H. F. TIEDKE.